United States Patent
Kumar et al.

(10) Patent No.: US 8,021,442 B2
(45) Date of Patent: Sep. 20, 2011

(54) PROCESS FOR THE PREPARATION OF COMMON SALT OF HIGH PURITY FROM BRINES IN SOLAR SALT PANS

(75) Inventors: Arvind Kumar, Bhavnagar (IN); Indrajit Mukhopadhyay, Bhavnagar (IN); Pushpito Kumar Ghosh, Bhavnagar (IN); Vadakke Puthoor Mohandas, Bhavnagar (IN); Jignesh Jasvantrai Shukla, Bhavnagar (IN); Rahul Jasvantrai Sanghavi, Bhavnagar (IN)

(73) Assignee: Council of Scientific & Industrial Research, New Delhi (IN)

( * ) Notice: Subject to any disclaimer, the term of this patent is extended or adjusted under 35 U.S.C. 154(b) by 215 days.

(21) Appl. No.: 12/240,762

(22) Filed: Sep. 29, 2008

(65) Prior Publication Data

US 2009/0175781 A1  Jul. 9, 2009

(30) Foreign Application Priority Data

Jan. 7, 2008  (IN) ................ 57/DEL/2008

(51) Int. Cl.
*C01D 3/00* (2006.01)
(52) U.S. Cl. ......... 23/295 S; 23/304; 23/302 R; 23/298; 423/158; 423/184
(58) Field of Classification Search .......... 23/298, 23/304, 295 S, 302 R; 423/158, 184
See application file for complete search history.

(56) References Cited

U.S. PATENT DOCUMENTS

| | | | |
|---|---|---|---|
| 3,647,396 A | 3/1972 | Dewittie et al. | |
| 3,891,297 A | 6/1975 | Poliak et al. | |
| 4,072,472 A | 2/1978 | Lukes | |
| 4,083,781 A * | 4/1978 | Conger | 210/651 |
| 4,652,378 A * | 3/1987 | Marikovsky et al. | 210/716 |
| 4,765,914 A * | 8/1988 | Marikovsky et al. | 210/716 |
| 4,956,157 A | 9/1990 | Nasu | |
| 5,039,427 A * | 8/1991 | Conover | 210/702 |
| 6,776,972 B2 | 8/2004 | Vohra et al. | |
| 6,812,011 B2 | 11/2004 | Mishra et al. | |
| 7,037,481 B2 | 5/2006 | Becenel | |
| 2004/0047781 A1 | 3/2004 | Becenel | |
| 2005/0098499 A1 | 5/2005 | Hussain | |
| 2005/0121395 A1* | 6/2005 | Landis et al. | 210/723 |

FOREIGN PATENT DOCUMENTS

| | | | |
|---|---|---|---|
| EP | 0291446 | * | 5/1988 |
| EP | 1545733 | | 1/2007 |
| JP | 54075497 | | 6/1979 |
| WO | 2004/041731 | * | 5/2004 |
| WO | WO 20007/036949 | | 4/2007 |
| WO | 2007/110733 | * | 10/2007 |

OTHER PUBLICATIONS

Bahruddin et al. "Penentuan Rasio Ca/Mg Optimum pada Proses Pemurnian Garam Dapur," Jurnal Natur Indonesia 6(1):16-19 (2003).

* cited by examiner

*Primary Examiner* — Steven Bos
(74) *Attorney, Agent, or Firm* — DLA Piper LLP (US)

(57) ABSTRACT

The process of the invention is an improvement over the existing process of producing salt of high purity from alum-treated brine disclosed recently in the prior art. More particularly, the invention rectifies the ratio of $Ca^{2+}$ to $Mg^{2+}$ from a value <1 to a value in the range of 2-3 desired by chlor-alkali and soda ash industries. The improved process involves the adjustment of pH of clarified brine with aqueous HCl so as to carry out salt crystallization at a pH of 6.5 instead of at the natural pH of 7. The pH adjustment reduces the $Mg^{2+}$ impurity in salt while slightly raising the $Ca^{2+}$ impurity in the salt and thereby achieving the desired ratio.

16 Claims, 1 Drawing Sheet

PROCESS FOR THE PREPARATION OF COMMON SALT OF HIGH PURITY FROM BRINES IN SOLAR SALT PANS

CROSS REFERENCE TO RELATED APPLICATION

This application claims the benefit of priority under 35 USC §119(a) of India Application No. 57/DEL/2008 filed Jan. 7, 2008.

BACKGROUND OF THE INVENTION

1. Field of the Invention

The present invention relates to an improved process for the preparation of solar salt from sea and sub-soil brines. More specifically the invention relates to a cost-effective process for preparation of common salt wherein both the absolute purity of the salt as well as the ratio of $Ca^{2+}$ to $Mg^{2+}$ are important, such as in chlor-alkali and soda ash industries. Still more specifically, the process relates to preparation of the above solar salt through an improved process wherein prior to charging of brine into crystallizers it is treated with alum to yield high purity salt as reported in the prior art followed by the inventive step of controlled adjustment of pH to also effect the desired ratio of $Ca^{2+}$ to $Mg^{2+}$ in the salt.

2. Background of the Invention

The world salt production has crossed two hundred million tons per annum. About 60% of the salt produced is used for industrial applications, chlor-alkali and soda ash industries being the major consumers. Superior quality industrial grade salt with specified $Ca^{2+}$ to $Mg^{2+}$ ratio is preferred by these industries as the use of such salt reduces the brine purification cost and effluent generation. 40% salt goes for human consumption where the caking of salt on storage poses great problems. This is attributed to the hygroscopic nature of the magnesium impurities present in salt. The lower magnesium content can also enhance the stability of iodizing agent in iodized salt.

Solar salt is produced using seawater, sub-soil brine and lake brine. All these brines constitute a multi-component salt system with a number of ions in the dissolved state and recovery of any of these salts in its pure form directly from these brines poses a problem. Hence salt produced from such brines is invariably contaminated with impurities such as $Ca^{2+}$, $Mg^{2+}$, $SO_4^{2-}$ and heavy metals. All these impurities are detrimental for industries where salt is used as a basic raw material. On the other hand, solar salt production from natural brines is most cost-effective. It is, therefore, important to devise means of making solar salt with minimum impurities while retaining the advantage of cost-effectiveness.

Reference may be made to the paper entitled "*Primary Brine Treatment Operations*" by D. Elliott presented at the 1999 Eltech Chlorine/Chlorate Seminar on Technology Bridge to the New Millenium, Ohio, 13 Sep. 1999, wherein the critical importance of salt purity and the deleterious effects of various contaminants including heavy metals on chlor-alkali manufacture are highlighted.

Brine caustic soda production results in brine mud, one of the largest waste streams from the chlor-alkali industry. About 30 kilograms of brine mud are generated for every 1000 kilograms of chlorine produced, but this varies with the purity of the salt used to produce the brine. The brine mud contains a variety of compounds, typically magnesium hydroxide and calcium carbonate, which are produced in the process of removing calcium and magnesium impurities in the salt through soda/lime treatment. Following the treatment the $Ca^{+2}$ and $Mg^{+2}$ impurities in the brine are reduced to ppm levels. The brine may then go through further purification utilizing ion selective resins.

Reference may once again be made to the article on *Primary Brine Treatment Operations* presented at the 1999 Eltech Chlorine/Chlorate Seminar on *Technology Bridge to the New Millennium* held at Cleveland, Ohio on Sep. 13, 1999, where in the importance of maintaining $Ca^{2+}$ to $Mg^{2+}$ ratio in salt is clearly explained. The higher magnesium content in salt poses the problem of settling the flocculent precipitates during the primary treatment of brine before its processing for chlor-alkali manufacture. It has been evidenced that the higher the magnesium content lower is the settling rates. Hence the chlor-alkali manufacturers insist on $Ca^{2+}$ to $Mg^{2+}$ ratio in range of 2-4. This above prior arts teach us that the absolute purity of salt as also the ratio of $Ca^{2+}$ to $Mg^{2+}$ are both important for a facile brine purification process with minimum waste generation.

Reference may be made to a large number of articles describing the manufacture of soda ash from salt by the Solvay process. Here again, brine purification through soda/lime treatment is of crucial importance.

Reference may be made to U.S. Pat. No. 7,037,481, dated May 2, 2006, wherein, Becenel, Jr. reports the methods and installations for producing ultra pure sodium chloride salt crystals primarily for use in saturating depleted brine resulting from the electrolytic decomposition of saturated brine in chlor alkali membrane cells for the production of chlorine, caustic soda and hydrogen. This invention particularly relates to the production of ultra pure sodium chloride salt crystals by processing primary treated brine by first acidifying the primary treated brine, then stripping the carbonic acid produced by acidification as carbon dioxide, and then returning the brine to a pH of about 6 or higher which is sufficient for processing it in evaporation equipment where the ultra pure salt crystals are produced.

In the article "*Washing of Strip Mined Rock and Solar Salt at Leslie Salt Corporation US*" (*Symposium on Salt—I*, Vol. 1, *the Northern Ohio Geological society Incorporation, Cleveland* (1961), p 449-464), A. Woodhill has reported that $Ca^{2+}$, $Mg^{2+}$, and $SO_4^{2-}$ impurities in solar salt can be reduced by mechanical washing. The main disadvantage of the method is that there is a 15-20% loss of salt and the method requires high capital investment. Moreover, the maximum level of reduction of $Ca^{2+}$ is 70% and embedded impurities are difficult to remove.

In the patent application GB 20020028351 and 20021205 dated 9 Jun. 2004 entitled "Extracting Sodium Chloride From Sea Water Using Nano Filtration" by Kenny Conor et al. it is reported that sea water is pretreated to make it suitable for nanofiltration and the nanofiltered sea water is sent to a thermal desalination plant which operates as a sodium chloride concentrator and a distilled water producer. Sodium chloride is crystallized from the concentrated solution and the process provides a high purity sodium chloride suitable for many industries. It is claimed that the salt so produced eliminates many of the requirements of the primary and secondary brine treatment for the chlor-alkali industries. The nanofiltration process has a higher rejection rate for calcium, magnesium and sulphate ions as compared to $Na^+$ or $Cl^-$ ions. The drawbacks of this process are that it would entail high capital investment and additional unit operations which would be uneconomical for standalone production of common salt in solar salt works. Moreover, it needs to be noted that whereas NaCl solubility in water is 35%, its solubility in brine is only 25% which means that advantage can be taken of the common ion effect to reduce NaCl solubility in brine which advantage would be lost if the divalent ions were to be completely removed by the process of nanofiltration and more time would be required for evaporation.

Reference may similarly be made to Central Salt & Marine Chemicals Research Institute's Biennial reports 2000-2002 and 2002-2004 wherein the purification of saturated brine through a nanofiltration process is reported.

In the patent application GB19540033194 19541116 dated Dec. 19, 1956 entitled "Improved Method of Preparing Sodium Chloride Brines of High Purity" Albright and Wilson have claimed that sodium chloride brines low in calcium sulphate content are prepared by dissolving solid sodium chloride contaminated with calcium sulphate in water in presence of a polyphosphate soluble in brine in the concentration range of 50-100 ppm. It is claimed that the amount of calcium sulphate is further decreased by dissolving solid sodium chloride in the presence of both the poly phosphate and water-soluble alkaline earth metal compound such as calcium chloride or acetate or barium chloride up to 1% level. The drawbacks of this process are that it is less appropriate for solar salt production and more appropriate as a means of post-treatment of brine obtained by dissolving salt.

Reference may be made to the European Patent No: EP 1,545,733,B9 (WO 2004/018068) dated Apr. 21, 1999 by Mayer et al. wherein an evaporative salt crystallization process that produces pure salt is disclosed. The process utilizes saccharide or its derivative in an evaporative process occurring at room temperature. The main disadvantage of the said process is that the saccharide is used in about 5% (w/v) concentration which would increase the viscosity of the brine and slow down evaporation and also add significantly to cost.

In their patent application (U.S. Pat. No. 3,891,297 dated Jun. 24, 1975) entitled "Crystallization of sodium chloride of reduced calcium sulfate content in presence of about 5 to about 500 ppm" by H. W. Fiedelman a process for the preparation of the cubic crystalline form of sodium chloride is described using either (1) a feed and bleed procedure comprising admixing an alkali metal phosphate with an aqueous solution of salt to increase the super saturation of calcium sulphate there in and evaporating the brine at an elevated temperature and reduced pressure to cause crystallization of pure salt and concomitantly bleeding brine from the chamber to the feed brine such as to maintain the calcium sulphate in the dissolved state and prevent its precipitation with salt or (2) subjecting the brine to solar evaporation to concentrate the same to the salt point, i.e., that point at which the salt will crystallize from the brine, adding an alkali metal polyphosphate to brine at this point to increase the super saturation of calcium sulphate there in and processing the brine for salt production following the conventional method. The process involves addition of costly chemicals at a very high dosage level. In the U.S. patent (U.S. Pat. No. 6,812,011 dated 2 Nov. 2004) entitled "An Improved Process for the Removal of Ca ions from the Brine by Marine Cyanobacteria" by S. Mishra et al. it has been claimed that common salt with reduced $Ca^{2+}$ impurity can be produced from sea/subsoil brine by mopping up $Ca^{2+}$ in the brine through certain types of marine cyanobacteria. The drawback of this process is that although the process has been demonstrated in small solar pans, it is not readily amenable to scale up. More over the process describes the method of reduction of $Ca^{2+}$ impurities whereas the process does not describe the reduction of remaining impurities such as magnesium and sulphate.

In their paper entitled "*Improvement in quality of salt from in-land brine of Kharaghoda area, India*" (*Research and Industry*, Vol. 37, March 1992, pp 46-48), A. U. Hamidani and J. R. Sanghavi have explained a method of reducing the $Ca^{2+}$ content in salt by establishing a common ion effect in the saturated brine by increasing the sulphate content through addition of either $MgSO_4$ or $Na_2SO_4$. The drawbacks of the method are that though the $Ca^{2+}$ content of salt is reduced, the $Mg^{2+}$ and $SO_4^{2-}$ content cannot be reduced. Moreover, it involves compositional changes which are sometimes difficult from a logistics and cost point of view.

In the U.S. patent (U.S. Pat. No. 6,776,972 dated 17 Aug. 2004) entitled "A Process for Recovery of Common Salt and Marine Chemicals from Brine in Integrated Manner" by R. N. Vohra et al. it is claimed that common salt and marine chemicals of high purity can be recovered in an integrated manner by forced desulphatation of brine with inexpensive sources of $CaCl_2$ such as distiller waste of Solvay Process prior to crystallization of salt. The process works well for any kind of brine and can also be carried out at large scale but the main drawback is the lack of availability of such calcium chloride source in the vicinity of most salt works. Another drawback of the process is that care must be taken to ensure that fresh brine does not mix inadvertently with desulphated brine in the crystallizer since the excess calcium chloride can form gypsum in the crystallizer that would deteriorate the quality of salt. Yet another draw back of the invention is that though the calcium impurities are reduced the magnesium content is not affected greatly by the distiller waste treatment. More over, a change in composition of brine is effected by the addition of distiller waste liquor.

H. M. Patel, in his research article that appeared in the *Proceedings of 6th International Symposium on Salt*, Vol. 2 pp. 515-533, has disclosed that $Ca^{2+}$ and $SO_4^{2-}$ impurities in salt can be reduced using the difference in dissolution rate of NaCl and $CaSO_4$. The main drawbacks of the process are that it employs unit operations like dissolver and chemical process reactor. It also requires addition of lime and soda for the removal of $Mg^{2+}$ and $Ca^{2+}$ and subsequent filtration of brine.

Reference may be made to the research article: "*Rain Washing of Common Salt Heaps*" by M. P. Bhatt et al. (*Salt Research and Industry* 10 (2), 1974, p 13) wherein it is reported that sea salt, as produced in solar pans contains 0.16-0.18% $Ca^{2+}$, 0.3-0.4% $Mg^{2+}$ and 0.70% $SO_4^{2-}$, whereas after rain washing the salt contains 0.21% $Ca^{2+}$, 0.06% $Mg^{2+}$ and 0.60% $SO_4^{2-}$. Although rain washing reduces $Mg^{2+}$ impurities to some extent, the $Ca^{2+}$ and $SO_4^{2-}$ impurities cannot be reduced from the harvested salt even by repeated washings. On the contrary, it is observed that the concentration of $Ca^{2+}$ increases after rain-washing. The effect of magnesium impurities at reduced levels of calcium to maintain the $Ca^{2+}$ to $Mg^{2+}$ ratio in salt is not described in the article.

In the article "*Manufacture of Solar Salt by Series Feeding System*" by R. B. Bhatt et al. (*Salt Research and Industry*, 11, 1979, p 9) it has been reported that solar salt with less impurities of $Ca^{2+}$ can be produced from sea water by a series feeding method wherein the salt is harvested in two stages i.e. between 25.5-27° Be' (Sp. Gr. 1.214-1.230) and 27-29° Be' (Sp. Gr.1.230-1.250). Salt harvested in the first stage is of a superior quality. Although this is a good process the drawback is that calcium and sulphate impurities cannot be reduced beyond a point even though higher levels of reduction are desirable. The article does not describe the processing of sub-soil brines which is deficient in sulphate content as compared to sea brine. More over the $Mg^{2+}$ content in the second fraction collected between 27-29° Be' (Sp. Gr.1.230-1.250) is found to be higher which can only be removed through mechanical washing involving losses of salt and additional cost.

In the Indian Patent No. 191912 (notified in the Indian Gazette) entitled "Preparation of Sodium Chloride Containing Low Ca Impurity from Sea Brine in Solar Salt Works" by J. R. Sanghavi et al. it is claimed that addition of a polysaccharide additive namely starch in concentration of 50-150 ppm into concentrated brine can reduce calcium impurity in salt to less than 0.05-0.1 percent as $Ca^{2+}$. The drawbacks of the process are that it requires addition of hot solution of starch which is both cumbersome and costly, addition has to be repeated several times and no mention is made of the effect of the treatment on other impurities in salt. No explanation is also provided for the origin of the observed effect. Moreover the magnesium content of salt cannot be reduced by the cited process.

In their patent application (WO 2004069371 dated 19 Aug., 2004), Kamishima Hiroshi et al. have claimed that sodium chloride crystals with reduced impurities can be produced from aqueous sodium chloride solutions by passing the solution through a column packed with an adsorbent on to which the impurity is selectively adsorbed. The method also provides a sodium chloride composition for preparing artificial seawater for use in algae cultivation, which is reduced in $Mg^{2+}$ ion or $Ca^{2+}$ ion concentration. The drawbacks of the process are that it is not applicable to a multi-component system like sea/sub-soil brine. This process does not give any clue about the production of superior quality salt directly from sea/sub-soil brine in a solar salt works.

In the patent (U.S. Pat. No. 4,072,472 dated Feb. 7, 1978) on High purity salt from high sulphate salt deposits by A. Lukes Jerome it is reported that subterranean salt deposit is solution mined, and the resulting calcium- and sulphate-contaminated brine is treated with soda ash to precipitate calcium compounds. After settling the slurry the clear brine is evaporated in a series of solar ponds to produce high-grade sodium chloride. This process is not economically feasible for large solar salt works where salt is produced from sea/sub-soil brines. Moreover, the process removes only calcium content from salt and the magnesium and sulphate impurities remain unaffected.

In the U.S. Pat. No. 3,647,396 dated 7 Mar. 1972 entitled "Production of High Purity Salt", H. W. Dewittie et al. have claimed to have developed a process for the recrystallization of sodium chloride in the form of high purity cubic crystals from a sodium chloride source containing calcium sulphate impurity by multi-effect evaporation preceded by treatment of the hot sodium chloride saturated brine by flocculants and settling, to cause the undissolved calcium sulphate particles and other suspended solids to agglomerate and settle out of the brine prior to recrystallization of sodium chloride eliminating the conventional requirement for filtering the hot brine. The main drawbacks of the process are that it involves recrystallization which is expensive, time consuming and energy intensive. There is no mention of the utility of the method for production of pure salt directly from sea brine or sub-soil brine in solar salt works.

AJK Environmental Specialties, Inc., Marchant Ville, N.J., USA has also come out with a commercial flocculating agent by the name of Aquasorb which is a cross linked polymer comprising solely of sodium polyacrylates. It is claimed that the product works well for brine clarification and removal of $Ca^{2+}$ and $Mg^{2+}$. Qumi International, Inc., Texas, USA has also claimed to have produced such polyacrylamide-based flocculants and coagulants for similar purposes. These flocculating agents are used to reduce residual $Ca^{2+}$ and $Mg^{2+}$ impurities in brine, such brine being thereafter used directly in industrial applications such as in chlor-alkali and soda ash industries. The reported process is specific to the treatment of brine prepared from the harvested salt and may not work directly with concentrated sea brine or sub-soil brine for the production of solar salt with highly reduced levels of calcium and magnesium impurities.

In patent No. WO2007036949 dated: Apr. 5, 2007, entitled "a cost-effective process for the preparation of solar salt having high purity and whiteness" Mukhopadhyay Indrajit et al. have claimed to have developed a cost effective process for the production of high purity solar salt (>99.5% purity on dry basis after heap washing) with improved whiteness having highly reduced levels of calcium and sulphate impurities and also of heavy metal ions. Although the process as developed has many advantages in terms of ease of operation and eliminating the calcium and sulphate impurities to the minimum possible levels, magnesium impurities, unfortunately, are not reduced in the same proportion as a result of which the $Ca^{2+}$ to $Mg^{2+}$ ratio in the salt is <1 and, consequently, fails to meet the preferred ratio of 2-4 desired for soda/lime treatment for brine purification in chlor-alkali and soda ash industries as alluded to above.

It is evident from the prior art that there are drawbacks in all of the prior arts, especially as applicable to solar salt production in the field. There are many processes where a salt of high purity is obtained but the processes are either cumbersome or costly and not practical for implementation in the field. There are other processes where the desired $Ca^{2+}$ to $Mg^{2+}$ ratio is obtained easily in the field but the absolute purity of the salt is poor. On the other hand, treatment of brine with alum to produce high purity salt as reported in the recent prior art is an attractive process for production of solar salt in the field, with purity >99.5% on dry basis. But, here again, the process suffers from the important drawback of yielding salt having undesired ratio of $Ca^{2+}$ to $Mg^{2+}$ because of which chlor-alkali and soda ash industries may be reluctant to use the product. It is therefore highly desirable to improve the alum treatment process to obtain salt with desired $Ca^{2+}$ to $Mg^{2+}$ ratio while retaining all of the obvious advantages of the process.

OBJECTS OF THE INVENTION

The main object of the present invention is to provide an Improved Process of Preparation of Common Salt of High Purity from Brines in Solar Salt Pans which obviates the drawbacks as detailed above.

Another object of the present invention is to produce common salt having purity >99.5% NaCl on dry weight basis and ratio of $Ca^{2+}$ to $Mg^{2+}$ in the range of 2:1 to 3:1 after washing of salt heaps with water.

Still another object of the present invention is to provide an improved process of producing pure salt using clarified alum-treated brine so as to not only achieve high purity of salt as disclosed in the prior art but also the desired $Ca^{2+}$ to $Mg^{2+}$ ratio currently not achieved with this process.

Yet another object of the present invention is to show that higher than desired level of $Mg^{2+}$ in the salt obtained through alum treatment is due to presence of insoluble magnesium compounds which cannot be easily removed through washing of salt heaps with dilute brine or water.

Yet another object of the present invention is to show that formation of such insoluble magnesium compounds is minimized by reducing the pH of the alum-treated saturated brine in the crystallizer.

Yet another object of the present invention is to show that reducing the pH leads to pronounced increase in the level of $Ca^{2+}$ impurity especially for pH <6.5.

Yet another object of the present invention is to utilize the above observations to optimally reduce pH of the brine to 6.5±0.1 to realize maximum advantage both from the viewpoint of process economics and also from the viewpoint of salt quality for chlor-alkali and soda ash industries.

Yet another object of the present invention is to show that such change of pH is carried out easily in the salt pan.

Yet another object of the present invention is to show that the incremental cost of pH adjustment works out to <5 U.S. cents per ton of salt.

BRIEF DESCRIPTION OF THE DRAWINGS

In the drawing accompanying the specification.

SUMMARY OF THE PRESENT INVENTION

Figure 1A:
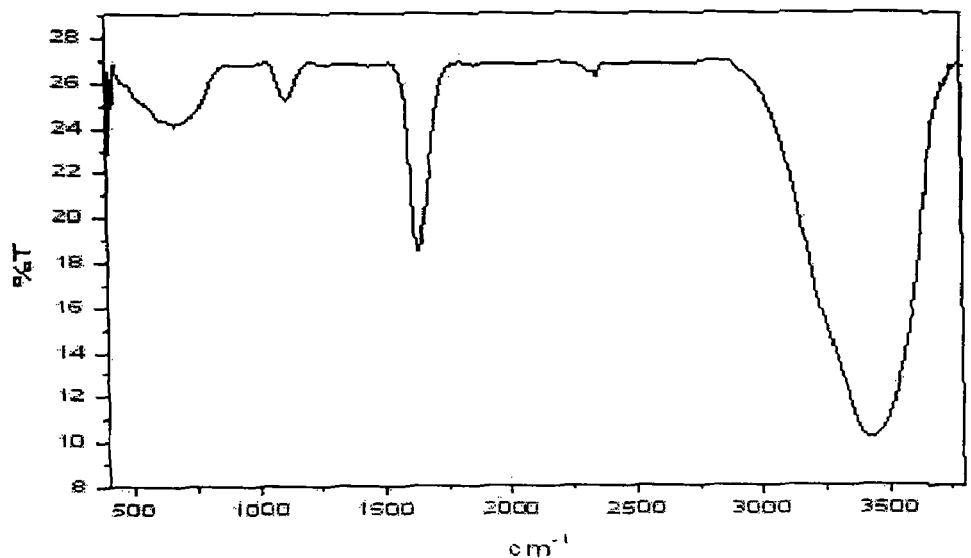
FIG. 1A is the FT-IR spectrum of salt produced from clarified brine without pH adjustment, i.e., at pH 6.95. The heaped salt was washed with water (200 liter of water per one ton heap). Peak at 668 $cm^{-1}$ is indicative of impurities of magnesium oxy compounds.
Figure 1B:
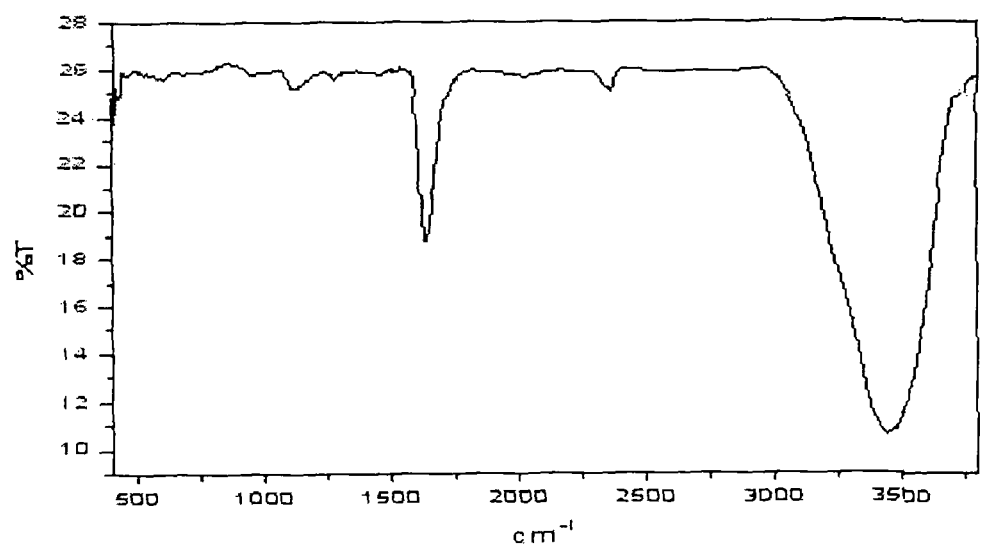
FIG. 1B is the FT IR spectrum of salt produced from clarified brine after pH adjustment to pH 6.5. The heaped salt was washed with water (200 liter of water per one ton heap). Peak at 668 $cm^{-1}$ indicative of impurities of magnesium oxy compounds is much reduced in intensity compared to FIG. 1A.

The present invention relates to a novel, easy-to-apply and cost-effective method of production of superior quality common salt with desired $Ca^{2+}$ to $Mg^{2+}$ ratio as required by the chlor-alkali and soda ash industries. The process is based on the clarification of brine with alum—which yields salt of very high purity as already reported in the prior art of PCT patent application No. WO2007036949—followed by adjustment of pH of the clarified brine to arrest the formation of insoluble magnesium oxy compounds in salt, since such compounds are difficult to dislodge from the salt even after washing. As a result, salt having both high absolute purity and $Ca^{2+}$ to $Mg^{2+}$ ratio in the range of 3:1 to 1:1 is produced.

STATEMENT OF INVENTION

Accordingly the present invention provides a process for preparing in the field an improved quality industrial grade solar salt from brines, the said salt having >99% absolute purity and the desired $Ca^{2+}$ to $Mg^{2+}$ ratio in the range of 2:1 to 3:1 after heap washing and the said process comprising the steps of:
(a) subjecting the brine to solar evaporation to crystallize out carbonate, salt and gypsum to obtain concentrated brine as reported in the prior art;
(b) feeding the brine of (a) into pre-crystallizer and dosing alum into the brine as reported in the prior art;
(c) settling of the suspended particles under gravity with concomitant clarification of brine as reported in the prior art;
(d) feeding of the above said clarified brine into a crystallizer by gradient flow through brine channels as reported in the prior art;
(e) treating the brine in the crystallizer with acid to lower the pH in the range of 5.5-6.9.
(f) continuing solar evaporation to crystallize out salt;
(g) draining out the bittern from the crystallizer as done routinely in the prior art;
(h) harvesting and heap washing and drying in the open sun to obtain the desired salt.

Through out the specification, the density of brine is defined in terms of $°Be$. $°Be$ is a convenient and widely used scale for measuring density of brines. It gives a direct measure of the quantity of salt dissolved in 100 g of solution. In American systems, degree baume is related to the specific gravity by the equation $$\text{Specific gravity} = 14/(145 - °Be).$$

In an embodiment of the present invention the brine used is natural brine and more particularly sea or subsoil brine.

In an embodiment of the present invention the concentrated brine after the process of step (a) has a density in the range of 23.5-24.5 °Be'.

In an embodiment of the present invention alum is prepared as an 8-12% (w/v) solution in dilute brine and added up to a concentration in the range of 25-75 ppm and preferably in the range of 30-40 ppm.

In an embodiment of the present invention the turbidity of the brine after alum treatment is reduced to 2.0-2.5 NTU.

In an embodiment of the present invention clarified brine yields salt with >99% absolute purity according to the prior art but with the drawback of having $Ca^{2+}$ to $Mg^{2+}$ ratio <1 detrimental for demanding industrial applications.

In an embodiment of the present invention the reduction of the pH of the clarified brine reduces the formation and co-precipitation of magnesium oxychlorides and magnesium oxysulphate with salt as confirmed through IR spectroscopic analysis.

In an embodiment of the present invention the progressive reduction of pH below 6.8 increases progressively the $Ca^{2+}$ to $Mg^{2+}$ ratio.

In another embodiment of the present invention the pH of the clarified brine after acid treatment is preferably in the range of 6.8-6.0 and still more preferably in the range of 6.5-6.3 to achieve the desired ratio of $Ca^{2+}$ to $Mg^{2+}$ in the most cost-effective manner.

In another embodiment of the present invention the acid treatment is given to brine under ambient conditions.

Yet another embodiment of the present invention the acid used for altering pH of the clarified brine is a mineral acid or an organic acid.

In an embodiment of the present invention the acid used for altering pH of the clarified brine is preferably concentrated hydrochloric acid.

In an embodiment of the present invention the process is cost effective and wherein the requirement of hydrochloric acid used is only 1-10 parts by volume for 100,000 parts by volume of brine.

In another embodiment of the present invention the concentrated hydrochloric acid is diluted to a concentration range of 0.01 N to 1.0 N prior to charging into brine.

Yet another embodiment of the present invention the heaped salt is initially washed with brine or water having acidic pH in the range of 5.5-6.9 to eliminate adhering impurities while ensuring minimum precipitation of magnesium oxychloride and further washed with untreated brine or water.

In an embodiment of the present invention the absolute purity of salt is more particularly in the range of 99.4-99.8% (w/w) on dry basis and the impurity levels of $Ca^{+2}$ and $Mg^{+2}$ in the salt obtained are 0.05±0.01% (w/w) and 0.03±0.01% (w/w), respectively.

DESCRIPTION OF THE INVENTION

Concentrated subsoil or sea brine having density of 23.5-24.5° Be' (Sp. Gr. 1.192-1.205) is clarified with alum solution at an optimized concentration of 30-40 ppm as described in the prior art (Patent No. WO2007036949 dated: Apr. 5, 2007). The clarified brine is further concentrated up to 25° Be' (Sp. Gr. 1.209) and then charged into specially designed solar salt pans. The pH of 25° Be' (Sp. Gr. 1.209) brine is measured as 6.98-7.00. The clarified brine of 25° Be' (Sp. Gr. 1.209) is treated with a calculated quantity of hydrochloric acid so as to achieve a pH value of 6-6.5, more specifically 6.4-6.5 of the clarified brine. It is estimated that 0.04-0.05 ml of 0.1 to 1 N hydrochloric acid is required for reducing the pH value of 1 L of the clarified brine of 25° Be' (Sp. Gr. 1.209) from 6.95±0.10. Hydrochloric acid used is only 100 to 1000 parts by volume for 100,000 parts by volume of brine. The total volume of brine in the crystallizing pans is measured as per the known procedure generally followed in a solar salt works. The requirement of acid for altering the pH of clarified brine is calculated based on the total volume of brine charged in the crystallizer for salt crystallization. The clarified brine of pH value 6.4-6.5 is further evaporated in salt pans as per the normal methodology being practiced in solar salt works. The concentrated brine on attaining 28-28.5° Be' (Sp. Gr. 1.240-1.245), termed as bittern, is discharged and the salt crystallized between 25 and 28.5° Be' (Sp. Gr. 1.209 and 1.245) is harvested and made into heaps as per the normal practice. The salt is heap washed using sea water and the requirement of wash water is calculated as ≈20% of the total weight of salt which is sufficient to get rid off the adhering superficial impurities present in the harvested salt.

The mechanism of the reduction of magnesium impurities is given as follows: $Mg^{2+}$ exists as a simple hydrated ion $[Mg(nH_2O)_n^{2+}]$ in acidic medium whereas it precipitates out as insoluble $Mg(OH)_2$ under alkaline conditions. In the intermediate pH range, e.g., the pH prevailing in natural brines, $Mg^{2+}$ can exist in the form of transition structures of oxy compounds such as magnesium oxysulphate $[Mg(OH)_2]_3.MgSO_4.8H_2O$ or magnesium oxychloride $[Mg(OH)_2]_5.MgCl_2.8H_2O$. These oxy compounds are expected to be less soluble than the simple hydrated $[Mg(nH_2O)^{2+}]$ and could therefore co-precipitate with salt. Moreover, the former are believed to act as good binders (Shand, M A. (2006). *The Chemistry and Technology of Magnesia*, Wiley Interscience) which may cause agglomeration of salt crystals making the subsequent purification of salt through washing more difficult. Since magnesium oxy chlorides and magnesium oxy sulphates are less stable at lower pH (equations 1-2 below), it was reasoned that a small reduction in the pH of the clarified brine may reduce the formation of such compounds and their co-precipitation with salt. It was further shown that Mg impurity in salt decreases progressively with reduction of pH and the FT-IR spectrum also confirmed the reduced presence of magnesium oxy compounds in the salt.

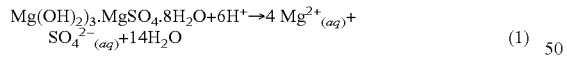

$$Mg(OH)_2]_3.MgSO_4.8H_2O+6H^+ \rightarrow 4\,Mg^{2+}_{(aq)}+SO_4^{2-}_{(aq)}+14H_2O \quad (1)$$

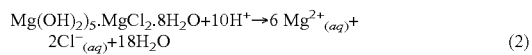

$$Mg(OH)_2]_5.MgCl_2.8H_2O+10H^+ \rightarrow 6\,Mg^{2+}_{(aq)}+2Cl^-_{(aq)}+18H_2O \quad (2)$$

It was subsequently shown that while reduction of Mg impurity of salt is indeed observed at lower pH values, the $Ca^{2+}$ impurity, unfortunately, shows a concomitant rise due to pH-dependent changes in the solubility of gypsum. The ideal balance was achieved at pH of 6.5 leading to a near ideal ratio of 2:1 of $Ca^{2+}:Mg^{2+}$, while also ensuring that the absolute levels of the impurities are low.

Since the pH reduction required to control the level of $Mg^{2+}$ is rather small, and further given that pH is a negative logarithmic scale which translates to small changes in $H_3O^+$ concentration (from $10^{-7}$M to $3.2 \times 10^{-7}$M), the economics of the process and its practical implementation become attractive, and only 200-300 mL of 0.1 to 1 N HCl is required per ton of salt produced from the brine. The process could be demonstrated in the field and the benefit of the invention confirmed through analysis of the salt.

Inventive Steps

The main inventive steps are:
(i) Recognizing that while alum-clarified brine yields salt with high absolute purity, the ratio of $Ca^{2+}$ to $Mg^{2+}$ is <1 which is not favored in demanding industrial applications.
(ii) Hypothesising—and thereafter proving—that the relatively higher level of magnesium impurity is on account of magnesium oxy compounds which can co-precipitate with salt during crystallization due to lower solubility and may also act as binder.
(iii) Recognizing that formation of magnesium oxy compounds during salt crystallization can be prevented by lowering the pH of the clarified brine in the crystallizers.
(iv) Observing that reduction of pH can, on the other hand, adversely affect $Ca^{2+}$ impurity level in the salt and thereafter identifying pH 6.5 as most optimum to achieve the desired $Ca^{2+}$ to $Mg^{2+}$ ratio while still maintaining high absolute levels of purity.
(v) Recognising that the invention can be applied to different types of brines.

The following examples are given by way of illustration and therefore should not be construed to limit the scope of the present invention.

Example 1

Comparative Example

Concentrated sub soil brine of density 24° Be' (Sp. Gr. 1.198) and having the chemical composition: $Ca^{2+}$=0.90 g/L, $Mg^{2+}$=13.5 g/L, $SO_4^{2-}$=8 g/L, $Na^+$=92.4 g/L (235 g/L as NaCl) was taken in a 2 L capacity glass beaker, the volume of brine in the beaker being 1 L. The brine was treated with a solution of alum so that the alum concentration in brine was 40 ppm. The post-treated brine was left undisturbed for 12-16 hours for clarification. The brine was further concentrated to 25° Be density (Sp. Gr. 1.209). The pH of the clarified brine having a turbidity of 2.5 NTU was measured as 7.0. The clarified brine was evaporated up to 28° Be (Sp. Gr. 1.240) and the salt fraction collected between the density range 25-28° Be (Sp. Gr. 1.209-1.240) was centrifuged. The salt crystallized had the composition $Ca^{2+}$=0.05%, $Mg^{2+}$=0.09% and $SO_4^{2-}$=0.15% with 99.6% NaCl on dry basis.

Example 2

In this example concentrated sub soil brine of density 24° Be' (Sp. Gr. 1.198) and having the chemical composition: $Ca^{2+}$=0.90 g/L, $Mg^{2+}$=13.5 g/L, $SO_4^{2-}$=8 g/L, $Na^+$=92.4 g/L (235 g/L as NaCl) was taken in a 2 L capacity glass beaker, the volume of brine in the beaker being 1 L. The brine was clarified by treating with a solution of alum and further concentrated to 25° Be density (Sp. Gr. 1.209) as described in Example 1. The clarified brine of 25° Be having a pH value of 7.0 was then treated with 4.4 ml of 0.1 N hydrochloric acid and the pH of the brine was lowered from 7.0 to 6.5. The resultant brine was evaporated up to 28° Be (Sp. Gr. 1.240) and the salt fraction collected between the density range 25-28° Be (Sp. Gr. 1.209-1.240) was centrifuged. The salt crystallized had the composition $Ca^{2+}$=0.06%, $Mg^{2+}$=0.03% and $SO_4^{2-}$=0.15% with >99.6% NaCl on dry basis.

Example 3

In this example concentrated sub soil brine of density 24° Be' (Sp. Gr. 1.198) and having the chemical composition: $Ca^{2+}=0.90$ g/L, $Mg^{2+}=13.5$ g/L, $SO_4^{2-}=8$ g/L, $Na^+=92.4$ g/L (235 g/L as NaCl) was taken in a 2 L capacity glass beaker, the volume of brine in the beaker being 1 L. The brine was clarified by treating with a solution of alum and further concentrated to 25° Be density (Sp. Gr. 1.209) as described in Example 1. The clarified brine of 25° Be having a pH value of 7.0 was treated with 8.8 ml of 0.1 N hydrochloric acid and the pH of the brine was lowered from 7.0 to 6.0. The resultant brine was evaporated up to 28° Be (Sp. Gr. 1.240) and the salt fraction collected between the density range 25-28° Be (Sp. Gr. 1.209-1.240) was centrifuged. The salt crystallized had the composition $Ca^{2+}=0.08\%$, $Mg^{2+}=0.03\%$ and $SO_4^{2-}=0.20\%$ with >99.5% NaCl on basis.

Example 4

In this example concentrated sub soil brine of density 24° Be' (Sp. Gr. 1.198) and having the chemical composition: $Ca^{2+}=0.90$ g/L, $Mg^{2+}=13.5$ g/L, $SO_4^{2-}=8$ g/L, $Na^+=92.4$ g/L (235 g/L as NaCl) was taken in a 2 L capacity glass beaker, the volume of brine in the beaker being 1 L. The brine was clarified by treating with a solution of alum and further concentrated to 25° Be density (Sp. Gr. 1.209) as described in Example 1. The clarified brine of 25° Be having a pH value of 7.0 was then treated with 13.2 ml of 0.1 N hydrochloric acid and the pH of the brine was lowered from 7.0 to 5.5. The resultant brine was evaporated up to 28° Be (Sp. Gr. 1.240) and the salt fraction collected between the density range 25-28° Be (Sp. Gr. 1.209-1.240) was centrifuged. The salt crystallized had the composition $Ca^{2+}=0.09\%$, $Mg^{2+}=0.02\%$ and $SO_4^{2-}=0.22\%$ with >99.5% NaCl on dry basis.

Quality of the salt obtained at various pH levels is shown in Table 1.

TABLE 1

$Ca^{2+}$, $Mg^{2+}$ and $SO_4^{2-}$ impurity levels in the salts of Examples 1-4

| Example No. | pH of brine | $Ca^{2+}$ | $Mg^{2+}$ | $Ca^{2+}$ to $Mg^{2+}$ ratio | $SO_4^{2-}$ |
|---|---|---|---|---|---|
| 1 | 7 | 0.05 | 0.09 | 0.6:1 | 0.15 |
| 2 | 6.5 | 0.06 | 0.03 | 2.0:1 | 0.15 |
| 3 | 6.0 | 0.08 | 0.03 | 2.7:1 | 0.20 |
| 4 | 5.5 | 0.09 | 0.02 | 4.5:1 | 0.22 |

Example 5

In this example sub-soil brine from Bhavnagar (Gujarat, India) was concentrated to a density of 24° Be' (Sp. Gr. 1.198) at which point its chemical composition was: $Ca^{2+}=0.90$ g/L, $Mg^{2+}=13.5$ g/L, $SO_4^{2-}=6.5$ g/L, $Na^+=92.4$ g/L (235 g/L as NaCl). The brine was taken up to a depth of 13 inches in a solar pan of 400 ft×125 ft size and dosed with 40 ppm of alum solution as described in the prior art. After 48 hours the clarified brine of 25° Be' (Sp. Gr. 1.209) having a turbidity of 2.5 NTU was charged in a salt crystallizer of size 27.5 ft×13.5 ft lined with a black plastic liner up to a depth of 12 inches and the total volume of clarified brine in the crystallizer was measured as 11 m³. The brine in the crystallizing pan was treated with a calculated quantity of 48 L 0.1 N hydrochloric acid so as to reduce the pH value from 7.0 to 6.5. The brine was subjected to solar evaporation in the open pan till a density of 28° Be' (Sp. Gr. 1.240) was attained. The bittern of 28° Be' (Sp. Gr. 1.240) was discharged in another pan and the volume of bittern was measured as 2 m³. The salt crystallized between 25° Be' (Sp. Gr. 1.209) and 28° Be' (Sp. Gr. 1.240) was harvested and heaped. The salt heap was washed with 20% (w/v) fresh water to yield about 2 Ton of heap washed salt having the specification as $Ca^{2+}=0.06\%$, $Mg^{2+}=0.04\%$, $SO_4^{2-}=0.15\%$ with 99.6% NaCl on dry basis. The moisture content of salt was measured as <0.2%.

Example 6

In this example the experiment was conducted in the field using sea brine from creeks in Bhavnagar (Gujarat, India) region fed by the Gulf of Cambay. Brine of density 24° Be' (Sp. Gr. 1.198) having the chemical composition as: $Ca^{2+}=0.54$ g/L, $Mg^{2+}=12.5$ g/L, $SO_4^{2-}=17.4$ g/L and $Na^+=92.4$ g/L (235 g/L as NaCl) was filled in an open pan of size 100 ft×30 ft and was given alum treatment to the level of 40 ppm. The alum treated brine was left undisturbed in the pan for 24 hours enabling the flocs to settle completely under gravity as reported in the prior art. The supernatant brine of density 25° Be' (Sp. Gr. 1.209) was then fed to a crystallizer of size 27.5 ft×13.5 ft lined with a black plastic liner up to a depth of 12 inches. The total feed brine volume was 11 m³. The clarified brine of 25° Be' (Sp. Gr. 1.209) was treated with 48 L 0.1 N hydrochloric acid to change the pH of brine from 7.0 to 6.5. The brine was subjected to solar evaporation and proceeded as described in Example 3. The washed salt (1.8 ton) analyzed $Ca^{2+}=0.05\%$, $Mg^{2+}=0.03$, $SO_4^{2-}=0.14\%$ and NaCl=99.6% on dry basis.

Example 7

Comparative Example

In this example clarified sub-soil brine of density 25° Be' (Sp. Gr. 1.209) having similar analysis to that of Example 3 was fed into the crystallizer (27.5 ft×13.5 ft) up to a depth of 12 inch without any alteration of pH. Salt was crystallized from the brine under the same conditions as described in Example 3. The heap washed salt analyzed $Ca^{2+}=0.05\%$, $Mg^{2+}=0.09\%$ and $SO_4^{2-}=0.15\%$ with >99.6% NaCl on dry basis. The moisture content of salt was measured as <0.5%.

Example 8

Comparative Example

In this example untreated sub-soil brine of density 25° Be' (Sp. Gr. 1.209) having similar analysis to that of Example 3 was fed into the crystallizer (27.5 ft×13.5 ft) up to a depth of 12 inch without changing the pH. Salt was crystallized from the brine near neutral pH under the same conditions as described in Example 3. The heap washed salt analyzed $Ca^{2+}=0.21\%$, $Mg^{2+}=0.12\%$ and $SO_4^{2-}=0.55\%$ with 98% NaCl on dry basis.

It can be seen from Examples 2, 5 and 6 that the adjustment of pH from 7.0 to 6.5 of the clarified brine at 25° Be' (Sp. Gr. 1.209) facilitates the production of solar salt with reduced levels of $Mg^{2+}$ impurities and also maintaining the $Ca^{2+}$ to $Mg^{2+}$ ratio in the range of 2:1 to 3:1 required for chlor-alkali and soda ash manufacture.

ADVANTAGES OF THE INVENTION

The main advantages of the present invention are:
(1) Sea brine or sub-soil brine, as the case may be, can be upgraded through the process of the invention to yield improved quality of solar salt with high absolute purity and also with desired $Ca^{2+}$ to $Mg^{2+}$ ratio directly in the field.
(2) The process is cost effective as it involves use of inexpensive alum at low dosage level as already reported in the prior art followed by minor adjustment of pH with small quantity of hydrochloric acid which does not add significantly to cost.
(3) The process of the invention can be practiced in any solar salt works regardless of its size and location.

What is claimed is:

1. A process for preparing industrial grade solar salt from brines in the field having >99% absolute purity and $Ca^{2+}$ to $Mg^{2+}$ ratio in the range of 3:1 to 1:1 after heap washing, the said process comprising the steps of:
   (a) subjecting the brine to solar evaporation to crystallize carbonate salt and gypsum and to obtain a concentrated brine;
   (b) feeding the concentrated brine as obtained in step (a) into pre-crystallizer and dosing alum into the concentrated brine fed into the pre-crystallizer to form suspended particles;
   (c) settling of the suspended particles formed in step (b) under gravity with concomitant clarification of concentrated brine in the pre-crystallizer to obtain clarified brine;
   (d) feeding the said clarified brine into a crystallizer by gradient flow through brine channels;
   (e) treating the clarified brine fed into the crystallizer in step (d) with an acid to lower the pH in the range of 5.5-6.9;
   (f) continuing solar evaporation of treated clarified brine of step (e) in the crystallizer to crystallize salt;
   (g) draining bittern from the crystallizer; and
   (h) harvesting and heap washing of the salt crystallized in step (f) followed by drying in the sun.

2. A process as claimed in claim 1 wherein the brine in step (a) is sea or subsoil brine.

3. A process as claimed in claim 1 wherein the concentrated brine obtained in step (a) has a density in the range of 23.5-24.5 °Be'.

4. A process as claimed in step (b) of claim 1 wherein the alum is prepared as an 8-12% (w/v) solution in dilute brine and dosed up to a concentration in the range of 25-75 ppm.

5. A process as claimed in steps (b) and (c) of claim 1 wherein the turbidity of the clarified brine thus obtained in step (c) after alum treatment in step (b) is reduced to 2.0-2.5 NTU.

6. A process as claimed in claim 1 wherein the treated clarified brine of step (e) yields salt with >99% absolute purity and not having $Ca^{2+}$ to $Mg^{2+}$ ratio <1.

7. A process as claimed in step (e) of claim 1 wherein reduction of the pH of the clarified brine reduces the formation and co-precipitation of magnesium oxychloride with salt.

8. A process as claimed in claim 1 wherein progressive reduction of pH below 6.8 increases progressively the $Ca^{2+}$ to $Mg^{2+}$ ratio.

9. A process as claimed in claim 1 wherein the pH of the clarified brine after acid treatment is in the range of 6.8-6.0.

10. A process as claimed in claim 1 wherein the acid treatment is given to the clarified brine under ambient conditions.

11. A process as claimed in claim 1 wherein the acid is a mineral acid or an organic acid.

12. A process as claimed in claim 1 wherein the acid is concentrated hydrochloric acid.

13. A process as claimed in claim 12 wherein 0.1 N hydrochloric acid is used in the ratio of 100 to 1000 parts by volume of acid for 100,000 parts by volume of clarified brine.

14. A process as claimed in claim 1 wherein the salt harvested in step (h) is made into heaps and washed with brine or water having acidic pH in the range of 5.5-6.9 to eliminate adhering impurities while ensuring minimum precipitation of magnesium oxychloride and further washed with untreated brine or water.

15. A process as claimed in claim 1 wherein the absolute purity of salt is in the range of 99.4-99.8% NaCl (w/w) on dry basis and the impurity levels of $Ca^{+2}$ and $Mg^{+2}$ in the salt obtained are 0.05±0.01% (w/w) and 0.03±0.01% (w/w), respectively.

16. A process as claimed in claim 1 wherein the pH of the clarified brine after acid treatment is in the range of 6.5-6.3 to achieve the ratio of $Ca^{2+}$ to $Mg^{2+}$.

* * * * *